(No Model.)
D. LUBIN.
CLOD CRUSHER AND LEVELER.
No. 350,205. Patented Oct. 5, 1886.
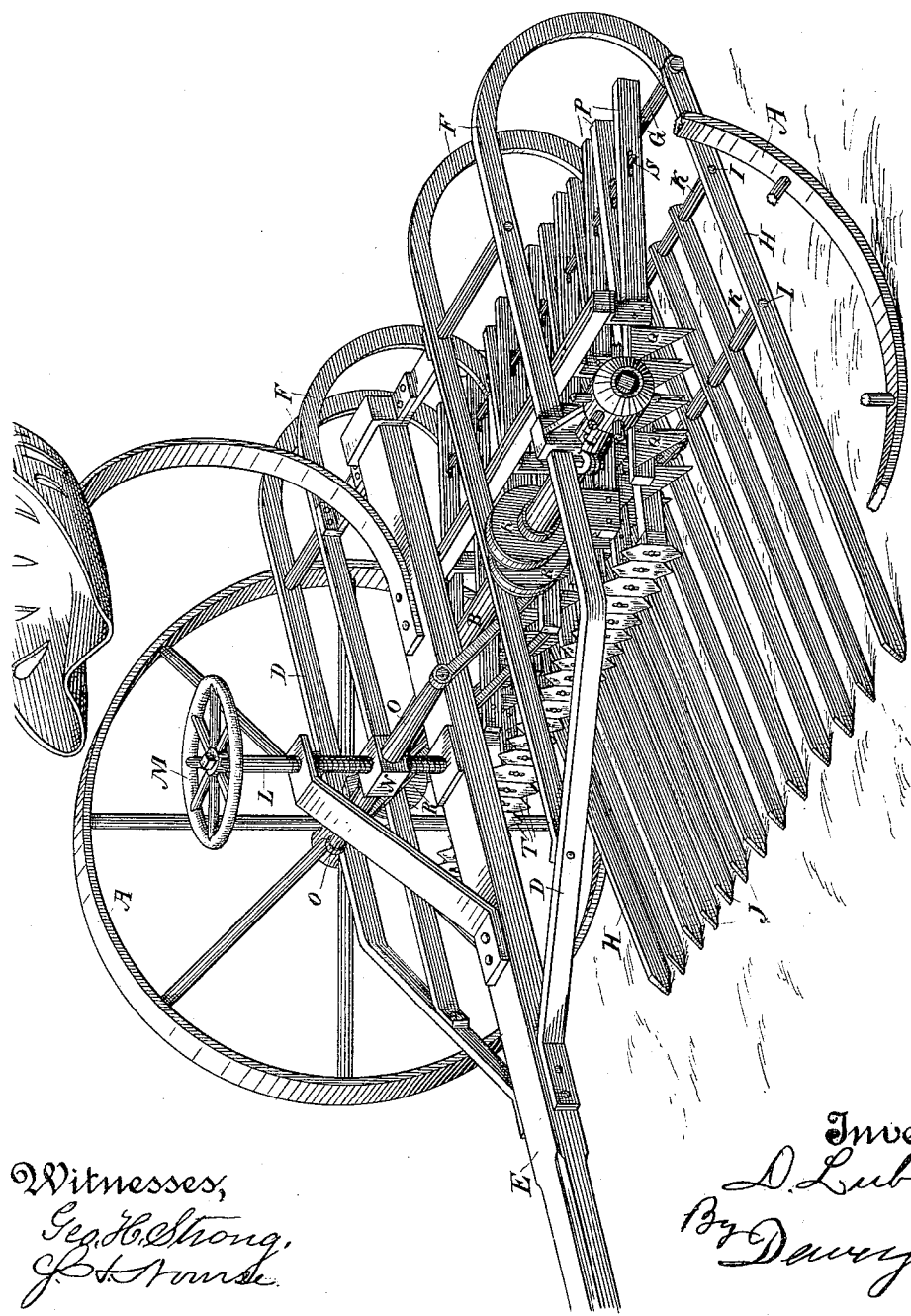
Witnesses,
Geo. H. Strong.
J. A. Rowse.
Inventor,
D. Lubin
By Dewey & Co.
Attys

UNITED STATES PATENT OFFICE.

DAVID LUBIN, OF SACRAMENTO, CALIFORNIA.

CLOD CRUSHER AND LEVELER.

SPECIFICATION forming part of Letters Patent No. 350,205, dated October 5, 1886.

Application filed June 28, 1886. Serial No. 206,543. (No model.)

*To all whom it may concern:*

Be it known that I, DAVID LUBIN, of Sacramento, Sacramento county, State of California, have invented an Improvement in Clod Crushers and Levelers; and I hereby declare the following to be a full, clear, and exact description of the same.

My invention relates to an apparatus which is especially designed to crush clods and compacted masses of earth, so as to reduce them to a proper size for ordinary cultivation, the machine also serving to partially level the surface while doing this work, and it is useful in preparing land for cultivation and for vineyard and orchard use.

Referring to the accompanying drawing for a more complete explanation of my invention, the figure is a side elevation with vertical section across the axle.

My invention is designed to produce an apparatus for reducing lumps and clods and preparing soil for cultivation; and it consists of an open platform of longitudinal bars, with a second series of bars caused to vibrate or oscillate above this open-work platform, and provided with knives or devices for breaking the lumps or clods as they are presented.

A A are bearing-wheels keyed to an axle, B, which turns in journal-boxes C, secured to the frame-work D of the apparatus, thus supporting this frame-work from the axle and wheels.

E is the pole to which the team is attached, and by which it is drawn about the field. Arms F extend rearwardly, curving downward behind the machine, having their rear ends united by a bar, G. This bar serves as a fulcrum, from which a frame-work, H, is supported, composed of two side bars and a central one in the present case, with rods I extending from side to side and uniting them, as shown. These rods serve as supports for the stout pointed bars J, which are perforated, so that the rods pass through them, and they are kept at a certain distance apart by short sections of tube, K, which slip over the rods between each pair of the bars. These pointed bars extend beneath the axle of the apparatus toward the front, inclining downward, so that their points will enter the ground, and when the machine is drawn along over the ground they serve to raise all of the clods or lumps of earth that have a greater diameter than the space between the bars, this space being of any desired diameter. In order to adjust the points of these bars and raise or lower them, I employ a screw, L, which is mounted upon the pole of frame in the front of the driver's seat, and has a hand-wheel, M, at the top, by which it can be turned. Upon this screw is fitted a nut, N, and from this nut arms O extend downward and connect with one of the transverse rods or bars I, which extend through the frame H and the lifting fingers in front of their fulcrum. It will be seen that when the screw is turned the nut will move up or down upon it, and will carry with it the fingers, and thus regulate the amount of their entrance into the soil. The clods which are raised by these fingers slide upward and back over the slight incline, and they are crushed by means of arms P, which are provided with cutting-blades Q, of any suitable or desired form, and are operated by eccentrics, cranks, or cams from the wheel-axle. In the present case I have shown eccentrics R keyed to the axle in pairs, and so that their throw is radially opposite each other. These eccentrics are provided with straps or inclosing-boxes, which are connected with the arms P, so that the alternate arms are caused to move in opposite directions. The rear ends of these arms are supported by means of a rod, S, which passes through holes made in one set of arms and slots which are made in the other set, so as to allow them to move in opposite directions from the first set. Upon the front ends of the alternate arms, or every other one of them, as may be desired, are fixed cutting or breaking blades T. The operation will then be as follows: The clods are lifted by the fingers, and all dirt which is smaller than the space between the lifting-fingers will at once fall through, while the larger clods will remain upon the fingers, being forced backward by the constant accession from the front. By the rotation of the bearing wheel, as the apparatus is moved over the ground, the eccentrics upon the shaft are also caused to rotate, and by their connection with the arms P the front ends of these arms are caused to rise and fall, moving backward at the same time, so as to bring the knives or cutters upon them into contact with the clods. As the arms P incline backward and downward, while the fingers incline backward and upward, they approach each other, so that as the clods move backward by each impulse of the cutters or breakers they will become reduced in diameter until they are sufficiently small to fall through the spaces between or beyond the lifting-fingers. If any clod or stone be raised from the surface which is too hard to be broken, the rear ends of the arms P will simply be allowed to rise until the stone has passed out at the rear. The weight of these arms and their cutters will ordinarily be sufficient to hold the rear ends down with all the force that is necessary to crush clods; but if it be found desirable to hold them down with greater force it may be done by means of a spring or springs, which are so attached as to hold the arms down with any desired force. By this apparatus only the clods which are so large as to need breaking will be lifted by the open-work platform, and this platform presents a surface of sufficient solidity to resist the action of the oscillating crushing-arms P, so that the clods are carried between two positively-acting surfaces, and must, therefore, be crushed before they can escape. In some cases the open platform may be dispensed with and the blades or crushers operate directly upon the clods resting upon the surface of the ground. Other devices may also be used to actuate the breaking arms without altering my invention.

Having thus described my invention, what I claim as new, and desire to secure by Letters Patent, is—

1. A clod-crusher having an artificial platform upon which the clods are first raised, in combination with vibrating arms between which and the platform the clods are crushed, substantially as herein described.

2. In a clod-crusher, the inclined lifting fingers or arms forming the open platform upon which the clods are raised; in combination with a series of arms extending backward above the lifting-fingers and approaching them at the same time, and cranks, eccentrics, or cams, by which the arms are caused to oscillate or vibrate above the fingers, substantially as herein described.

3. The lifting-fingers forming an open-work platform, in combination with the inclined arms having cutters or crushing-plates attached to them, and cranks or eccentrics by which these arms are caused to rise and fall above the lifting-fingers, substantially as herein described.

4. The inclined lifting-fingers forming an open platform upon which the clods are raised, having their rear ends pivoted or hinged to the rear of the fixed frame-work, and the transverse bars I, in combination with the screw L upon the pole of the frame, the nut N, engaged by said screw, and the arms extending downward and connecting with the one of the bars I, whereby the lifting-fingers may be raised or depressed, substantially as herein described.

5. The inclined adjustable lifting-fingers forming an open platform upon which the clods are raised, in combination with the movable arms and eccentrics or cranks by which they are caused to oscillate above the platform, said arms being provided with the cutting or crushing blades attached in a series one behind the other, and forming a tapering or gradually-reduced space between the arms and fingers, substantially as herein described.

6. A series of oscillating or vibrating arms with blades or breaking-edges, a wheeled vehicle from which these arms are suspended, and a mechanism by which the arms are moved, so as to crush or break lumps or clods as they pass under them, substantially as herein described.

In witness whereof I have hereunto set my hand.

DAVID LUBIN.

Witnesses:
S. H. NOURSE,
GEO. H. STRONG.